Aug. 15, 1961  J. SIDLES  2,995,927
APPARATUS FOR MEASURING VIBRATIONS OF A VEHICLE
Filed Dec. 21, 1959  3 Sheets-Sheet 1

Aug. 15, 1961  J. SIDLES  2,995,927
APPARATUS FOR MEASURING VIBRATIONS OF A VEHICLE
Filed Dec. 21, 1959  3 Sheets-Sheet 2

Aug. 15, 1961           J. SIDLES           2,995,927
APPARATUS FOR MEASURING VIBRATIONS OF A VEHICLE
Filed Dec. 21, 1959           3 Sheets-Sheet 3
FIG. 5
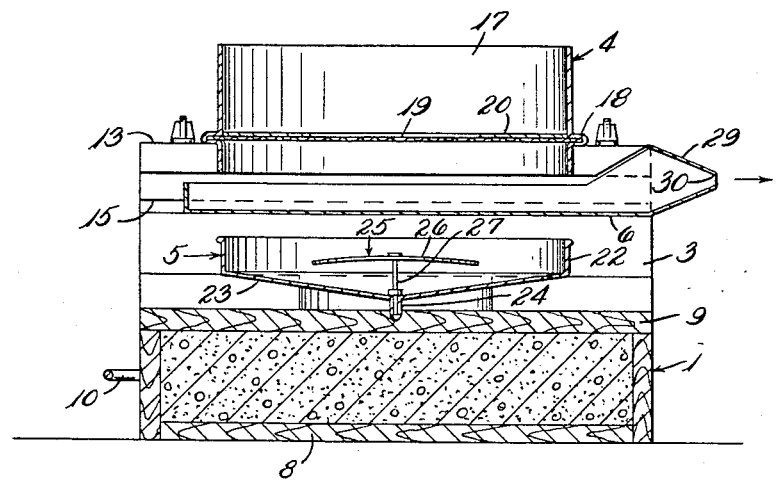
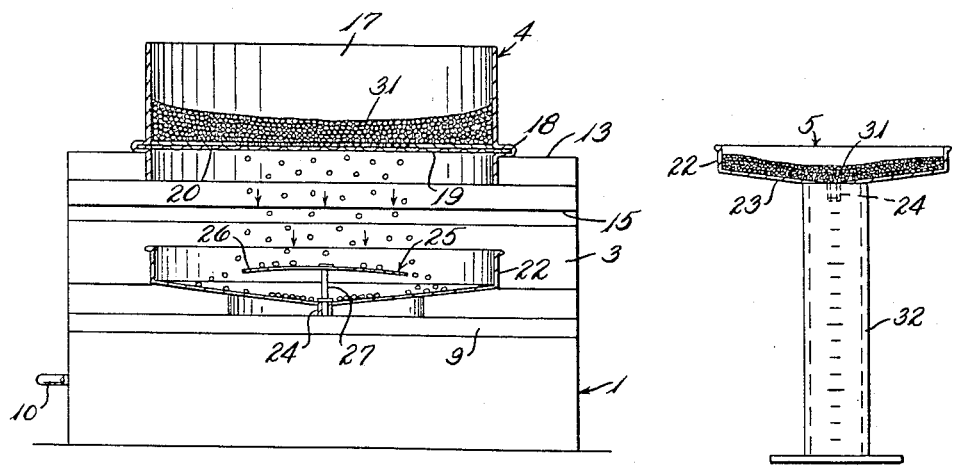
FIG. 6           FIG. 7

United States Patent Office 2,995,927
Patented Aug. 15, 1961

2,995,927
APPARATUS FOR MEASURING VIBRATIONS
OF A VEHICLE
James Sidles, Cuyahoga Falls, Ohio, assignor to The Firestone Tire & Rubber Company, Akron, Ohio, a corporation of Ohio
Filed Dec. 21, 1959, Ser. No. 860,985
1 Claim. (Cl. 73—70)

This invention relates to a device for sensing vibrations, and more particularly to a device for evaluating the ride vibration characteristics of a motor vehicle.

The preferred form of the invention is directed to a measuring device sensitive to vibrations of an automobile passing over the road surface. The device is especially useful in gauging the differences in characteristics of the slap, thump, and vibration set up by tires on the wheel.

It is, therefore, an object of this invention to provide means for quantitatively sensing the vibrations transmitted by an element upon which the device is mounted. Another object of the invention is to provide a device which may be mounted on a motor vehicle to quantatively measure the vibrations caused by the vehicle passing along the road surface. Yet another object of the invention is to provide a device which will quantitatively measure the sum of the effect of all the vibrations in an automobile being operated on a highway. A further object of the invention is to provide a device having a sieve filled with small symmetrical pellets which are shaken through the sieve in amounts proportional to the amount of vibration set up by operation of the vehicle.

These and other objects of the invention are obtained by providing a sieve mounted on a support sensitive to the vibrations to be measured, and by filling the sieve with uniform pellets which will pass through the sieve in proportion to the transmission of vibrations through the support to the sieve.

Figure 1:
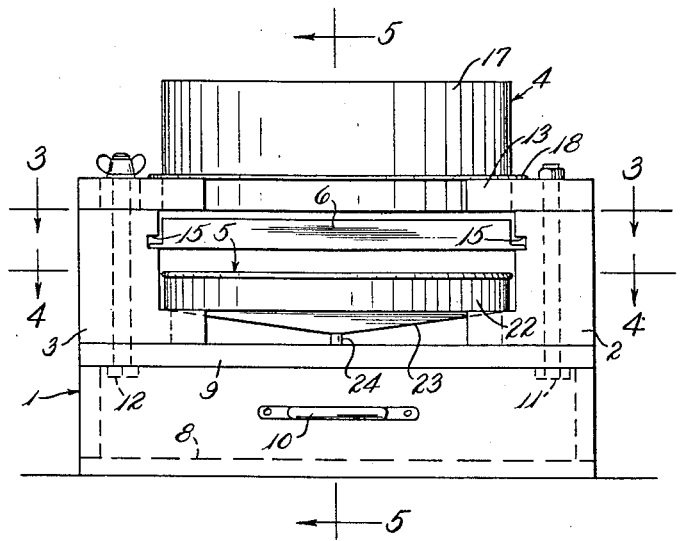
Figure 2:
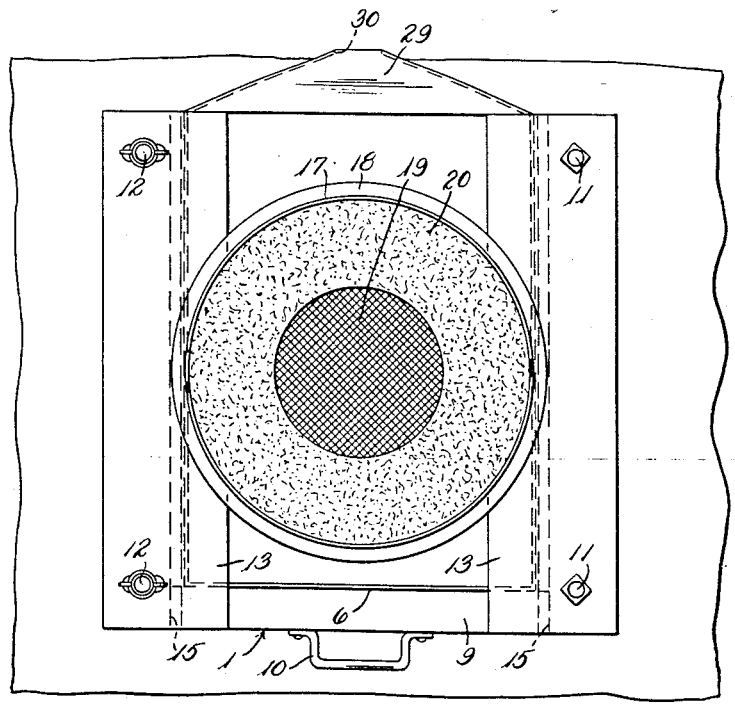
Figure 3:
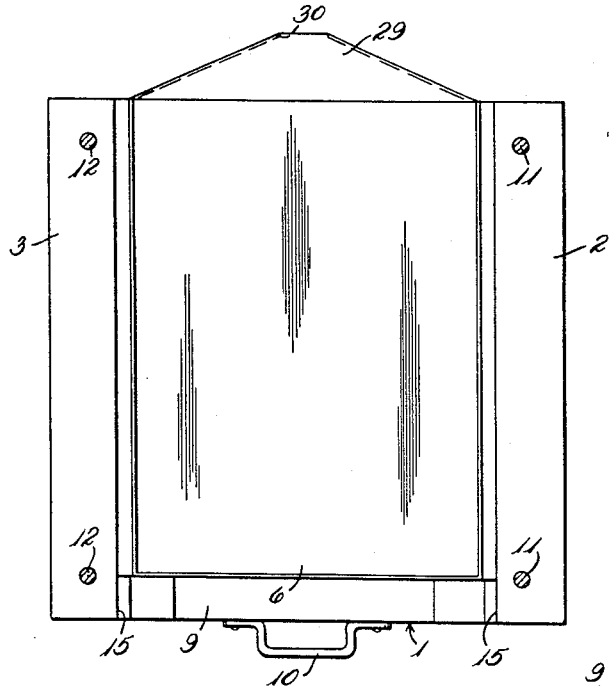
Figure 4:
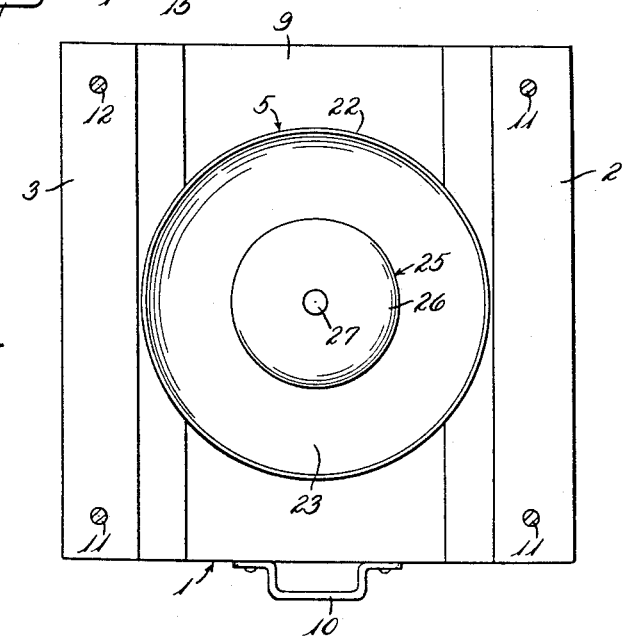

The objects of the invention may be more readily understood with reference to the specification, claim and drawings of which:

FIG. 1 is a side elevation of the device of the invention.
FIG. 2 is a plan view of the device of the invention.
FIG. 3 is a view taken along line 3—3 of FIG. 1.
FIG. 4 is a view taken on line 4—4 of FIG. 1.
FIG. 5 is a sectional view taken along line 5—5 of FIG. 1.
FIG. 6 is a view similar to FIG. 5 showing the operation of the device of the invention.
FIG. 7 is a view showing a device for measuring quantitatively the results of using the device of the invention.

With reference to the figures of the drawings, the device generally comprises a base 1 having upwardly projecting side supports 2 and 3 which mount a sieve 4 directly above a trap 5. Adapted for interposition between the trap 5 and the sieve 4 is a tray 6, the function of which will be explained hereinafter.

More particularly, the base 1 is comprised of a wooden frame having a lower member 8 and an upper member 9. A handle 10 facilitates carrying of the device between periods of use. Bolted to top member 9 by bolts 11 and 12 are the two side supports 2 and 3, each provided on inner facing sides with a ledge 13—13, as well as a pair of horizontal grooves 15—15.

Mounted on side supports 2 and 3 is sieve 4, comprised of a tubular body portion 17 having around its outer periphery, flange 18, and internally supporting a horizontal screen 19. The entire surface of screen 19 is not open because an annular marginal felt pad 20 closes off all but the center portion of the screen. The flange 18 of the screen is supported by the ledges 13—13 of the side supports 2 and 3. In line on center with the sieve is a trap 5 comprised of a tubular sidewall 22 and a conical base 23 supported at its apex by a tubular support 24. Projecting upwardly from the base of the trap is a sounder 25, having a flexible metal portion 26 supported by a rod 27 inserted in the tubular support 24.

In order to prevent pellets from dropping through the screen of the sieve onto the trap when a test is not being run, a tray 6 is interposed between the screen and the trap and adapted to slide in the grooves 15—15. Tray 6 has a funnel-shaped sidewall portion 29 defining an opening 30, which, when the tray is tilted, permits the contents of the tray to pour out.

In operation of the preferred form of the device and referring to FIG. 6, the mass of small cylindrical shaped pellets of about 0.040 in. in diameter and smaller than the smallest buckshot (known commercially as "Dust"), is loaded into the sieve 4 in preparation for the test. The bulk of the shot is such that it is prevented from getting through the screen in the absence of vibration. The sieve screen has openings of 0.0469 inch. To prevent the pellets from hitting the trap 5 before the test, tray 6 is in position interposed between the sieve and the trap. When the test is ready to commence, the tray 6 is removed and the vehicle put in motion. The device normally is mounted on the floor and, as the vehicle travels across the road surface the vibration of the wheels caused by the travel results in vibration picked up in base 1 and side supports 2 and 3. As the sieve 4 vibrates, pellets drop from the mass 31 through the screen and onto the trap 5. The sounder 25 is used to alert the operator that pellets are dropping through the screen, and has no other purpose, although the rod 27 does serve to stop the passage in tubular support 24. When the test is complete, the trap 5 is removed from the base 1 and centered over a glass measuring cylinder 32, FIG. 7. The sounder with rod 27 is pulled from the trap, and the pellets are allowed to roll through the orifice of tubular support 24 into the cylinder. It will be seen that as the pellets fill the cylinder, they can be measured by the scale on the sides of the cylinder. Since the number of pellets which are vibrated through the screen of the sieve is proportional to the total vibration effect of the car, it is possible to run comparative quantitative tests between different cars as well as between different tires on the same car. In other words, one set of tires may set up a great deal of vibration and result in a large volume of pellets being vibrated through screen 19 onto the trap 5. However, another set of tires may be ideally designed for a minimum of vibration and would, therefore, vibrate a very small number of pellets through the screen onto the trap.

Those skilled in the art will recognize that other modifications of the invention are possible, although the preferred form has been shown by way of example.

What is claimed is:

A device for measuring vibration of a vehicle to determine its ride characteristics comprising a base portion adapted for mounting on said vehicle and adapted to vibrate in response to the vibrations of said vehicle, a sieve mounted on said base portion, pellets within said sieve of a size to pass through the sieve when the vehicle vibrates, a trap in alignment with said sieve to receive said passed pellets, and means to measure the pellets accumulated in said trap whereby the quantity of pellets accumulated in said trap is an indication of the vibration characteristics of said vehicle.

(References on following page)

References Cited in the file of this patent

UNITED STATES PATENTS

| | | |
|---|---|---|
| 1,397,525 | Kennedy | Nov. 22, 1921 |
| 1,870,140 | Piette | Aug. 2, 1932 |
| 2,782,926 | Saxe | Feb. 26, 1957 |
| 2,854,539 | Ruppel | Sept. 30, 1958 |
| 2,938,087 | Meek | May 24, 1960 |

FOREIGN PATENTS

| | | |
|---|---|---|
| 834,605 | Germany | Mar. 20, 1952 |
| 310,496 | Great Britain | Aug. 15, 1929 |